United States Patent
Nerone

(10) Patent No.: US 6,677,715 B2
(45) Date of Patent: Jan. 13, 2004

(54) PORTABLE ELECTRONIC BALLAST

(75) Inventor: Louis R. Nerone, Brecksville, OH (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 10/247,797

(22) Filed: Sep. 19, 2002

(65) Prior Publication Data

US 2003/0090217 A1 May 15, 2003

Related U.S. Application Data

(60) Provisional application No. 60/323,447, filed on Sep. 19, 2001.

(51) Int. Cl.$^7$ ................................................ H05B 37/02
(52) U.S. Cl. ............. 315/209 R; 315/244; 315/DIG. 7; 363/13
(58) Field of Search .......................... 315/209 R, 224, 315/244, 307, DIG. 2, DIG. 5, DIG. 7; 363/13, 123

(56) References Cited

U.S. PATENT DOCUMENTS

| | | | | |
|---|---|---|---|---|
| 5,686,798 A | * | 11/1997 | Mattas ........................ | 315/244 |
| 5,737,207 A | * | 4/1998 | Uratani et al. ............... | 363/132 |
| 5,796,214 A | * | 8/1998 | Nerone ..................... | 315/209 R |
| 5,917,289 A | * | 6/1999 | Nerone et al. .......... | 315/209 R |
| 6,018,220 A | * | 1/2000 | Nerone ........................ | 315/219 |
| 6,459,214 B1 | * | 10/2002 | Chen et al. ................. | 315/247 |

* cited by examiner

*Primary Examiner*—Don Wong
*Assistant Examiner*—Thuy Vinh Tran
(74) *Attorney, Agent, or Firm*—Fay, Sharpe, Fagan, Minnich & McKee, LLP

(57) ABSTRACT

A portable lighting ballast includes first and second transistors 20, 22 for converting direct current from a voltage source 16 into alternating current to operate a lamp 10. The lamp has an ignition voltage that is significantly higher than the voltage that the source 16 produces. The battery is a typical 6 volt cell or a combined source of 4 "D" cells, also producing six volts. The ignition voltage of the lamp 10 is approximately 600 V. A transformer 34 boosts the alternating current signal from the transistors 20, 22 to an amplitude sufficient to ignite the lamp 10. The transformer 34 boosts the signal to 1.2 kV. After lamp ignition, the transformer settles the voltage to a steady state value.

17 Claims, 3 Drawing Sheets

PORTABLE ELECTRONIC BALLAST

This application claims the benefit of Provisional Application No. 60/323,447, filed Sep. 19, 2001.

BACKGROUND OF THE INVENTION

The present invention relates to the artificial illumination arts. It finds particular application in providing high ignition voltages for portable lamp ballasts and will be described with particular reference thereto. It is to be appreciated, however, that the present invention is also applicable to boosting voltages in fixed ballasts and other circuits, and is not limited to the aforementioned application.

Typical portable lamp ballasts utilize relatively low-cost, low-voltage sources to operate the lamp. For instance, certain types of popular fluorescent camping lanterns utilize four "D" cells. In other words, the lantern has a six volt source. Typically, much larger voltages are needed to ignite and sustain a lighted fluorescent lamp. Inexpensive fluorescent lamps, as are commonly found in such lanterns, require on the order of about 200 Volts to ignite. Consequently, when these systems initiate start-up, extremely high circulating currents are present in resonant tanks of the ballast, and relatively high-valued circuit components are required to meet the voltage demands for lamp ignition.

In addition to having high startup currents, typical portable ballasts are inefficient. As a result of limited voltage available from direct current sources, typical portable lamps utilize light sources that require less voltage to ignite, but are more inefficient, lessening light output and battery life.

BRIEF DESCRIPTION OF THE INVENTION

In accordance with one aspect of the present invention, a lighting ballast is provided. A voltage source provides current that is converted by a switching portion, the switching portion including first and second transistors. A drive portion is included. A resonant load portion receives a lamp, and a transformer boosts the voltage from the switching portion to the resonant load portion.

In accordance with another aspect of the present invention, a method of igniting a lamp is included. A threshold voltage is supplied by boosting a signal significantly higher than its direct current source. The direct current is converted into alternating current by a switching portion, the switching portion including first and second transistors.

In accordance with another aspect of the present invention, a portable lamp ballast is provided. A direct current battery provides power to the ballast. A complementary pair of MOSFETs convert the direct current signal from the battery into an alternating current signal. A drive inductor taps power from a resonant inductor. A transformer including primary and secondary windings boosts the alternating current signal to the lamp.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF THE INVENTION

Figure 1:
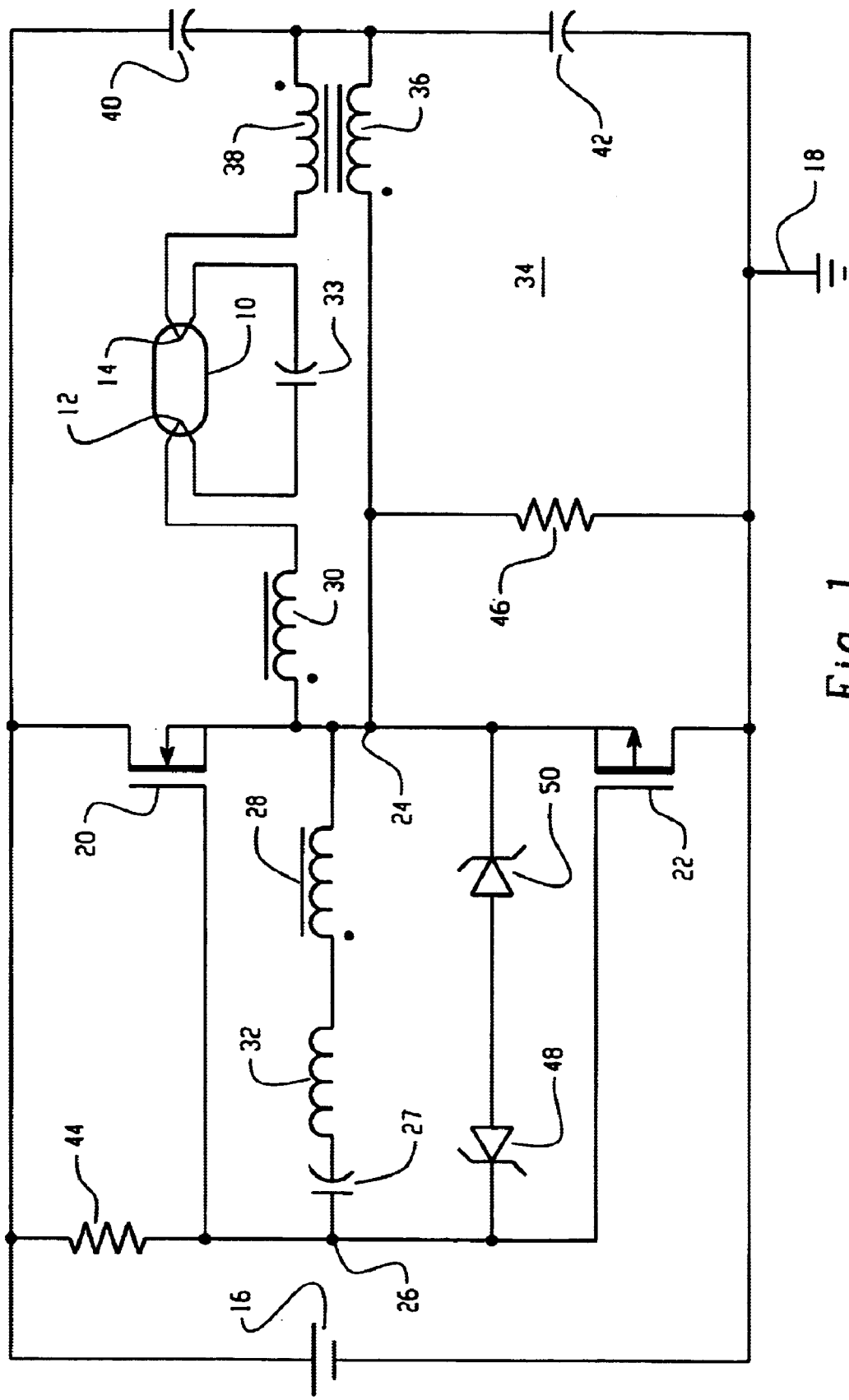
FIG. 1 is a circuit diagram of a ballast circuit, in accordance with the present invention.

With reference to FIG. 1, a lamp 10 is operably connected between contacts 12, 14 of a ballast housing circuit. In the preferred embodiment, the circuit is powered by a direct current (DC) battery 16 of 5 to 7 V. Preferably the bus voltage 16 is between 5.5 and 6 volts with 6 volts being ideal. The circuit is referenced at point 18 to ground. The lamp 10 is preferably a compact fluorescent lamp that operates at a particular frequency or range of frequencies. The ballast circuit provides AC power at the operational frequency of the lamp 10.

In order to convert a DC signal into an AC signal, a first transistor 20 and a second transistor 22 alternate between periods of conductivity and periods of non-conductivity, out of phase with each other. That is, when the first transistor 20 is conductive, the second transistor 22 is non-conductive, and vice-versa. The action of alternating periods of conduction of the transistors provides an AC signal across the contacts 12 and 14. In the preferred embodiment, the transistors are MOSFETs, but it is to be understood that bipolar junction transistors or other field effect transistors are also possible.

Each transistor 20, 22 has a respective gate and source. The voltage from gate to source on either transistor defines the conduction state of that transistor. That is, the gate-to-source voltage of transistor 20 defines the conductivity of transistor 20 and the gate-to-source voltage of transistor 22 defines the conductivity of transistor 22. As shown, the sources of the two transistors 20, 22 are connected at a common node 24. The gates of the transistors 20, 22 are connected at a control node 26. The single voltage between the control node 26 and the common node 24 determines the conductivity of both transistors 20, 22. The drains of the transistors 20, 22 are connected to the bus voltage 16 and ground 18, respectively.

A gate drive circuit, connected between the common node 24 and the control node 26 controls the conduction states of the transistors 20, 22. The gate drive circuit includes a serial capacitor 27, and a drive inductor 28 that is connected to a resonant inductor 30 at the common node 24. The other end of the drive inductor 28 is coupled to a phase inductor 32. The phase inductor 32 is used to adjust the phase angle of the base-emitter voltage appearing between nodes 24 and 26. The drive inductor 28 provides a driving energy for the operation of the drive circuit. The resonant inductor 30 along with a resonant capacitor 33 connected between nodes 12 and 14 determine the operating frequency of the lamp 10. The serial capacitor 27 charges to provide sufficient voltage to turn the first transistor 20 conductive. During steady state operation of the ballast, the serial capacitor 27 aids in switching between the two transistors 20, 22.

As stated previously, the voltage source is preferably a 6 V battery, or its equivalent. The lamp 10 of the preferred embodiment has a threshold ignition voltage of 500 to 700 V, more preferably in the range of 550 to 650 V with 600 V being most preferred. A transformer 34 boosts the bus voltage of 6 V to a magnitude adequate to ignite the lamp 10. Preferably, the transformer 34 boosts the voltage to between 1.0 and 1.4 kV during a period of time between when the ballast is activated and the lamp 10 ignites. The preferred ignition voltage is between 1.1 and 1.3 kV with 1.2 kV being ideal. After the lamp ignites, the ballast circuit settles to a steady state operation mode in which the transformer 34 boosts the bus voltage to a relatively small steady state value, relative to the ignition voltage. The steady state value of the preferred embodiment is on the order of 50 V.

The transformer 34 includes a primary winding 36 and a secondary winding 38. Current that passes through the primary winding 36 induces a current in the secondary winding 38. The secondary winding 38 is on operative connection with the lamp 10. The number of coil turns of the secondary winding 38 exposed to current passing through the primary winding 36 is controllable. Thus, the magnitude of the voltage transform is controllable. In the preferred operation of the transformer, during lamp ignition, all of the windings of the secondary coil 38 are exposed to the primary coil 36. This boosts the voltage to 1.2 kV, as discussed previously. Subsequent to lamp ignition, the number of secondary coil 38 windings exposed to the primary coil 36 is reduced, and the voltage across the lamp 10 drops to its steady state operating value. In an alternate embodiment, the transformer 34 is an auto transformer.

In the preferred embodiment, during periods of time when the lamp 10 is lit, a user can manipulate the windings ratio between the secondary and primary coils 38, 36 to adjust an intensity of the lamp 10. The user can select high medium and low settings, for instance, thereby changing the windings ratio, the voltage across the lamp 10 and ultimately the brightness of the lamp 10. Possible windings ratios are, for high intensity, 24:1, for medium intensity, 12:1, and for low intensity, 6:1. Alternately, an analog dial may be used to select and de-select windings, giving the user a dimming control of the intensity of the lamp. Regardless of the method used to give the user intensity control, the lowest setting that the user may select still provides the lamp 10 with sufficient voltage to stay lit, unless, of course, if the user selects an off position, in which power is cut from the ballast circuit.

Additionally, the ballast circuit includes smoothing capacitors 40, 42 between the bus voltage 16 and ground 18 to smooth abnormalities and noise in the bus voltage signal. Starting resistors 44, 46 prevent current in the ballast circuit from exceeding tolerable levels during startup, before the capacitors and inductors are charged. Back to back Zener diodes 48, 50 clamp the voltage across the transistors 20, 22.

Figure 2:
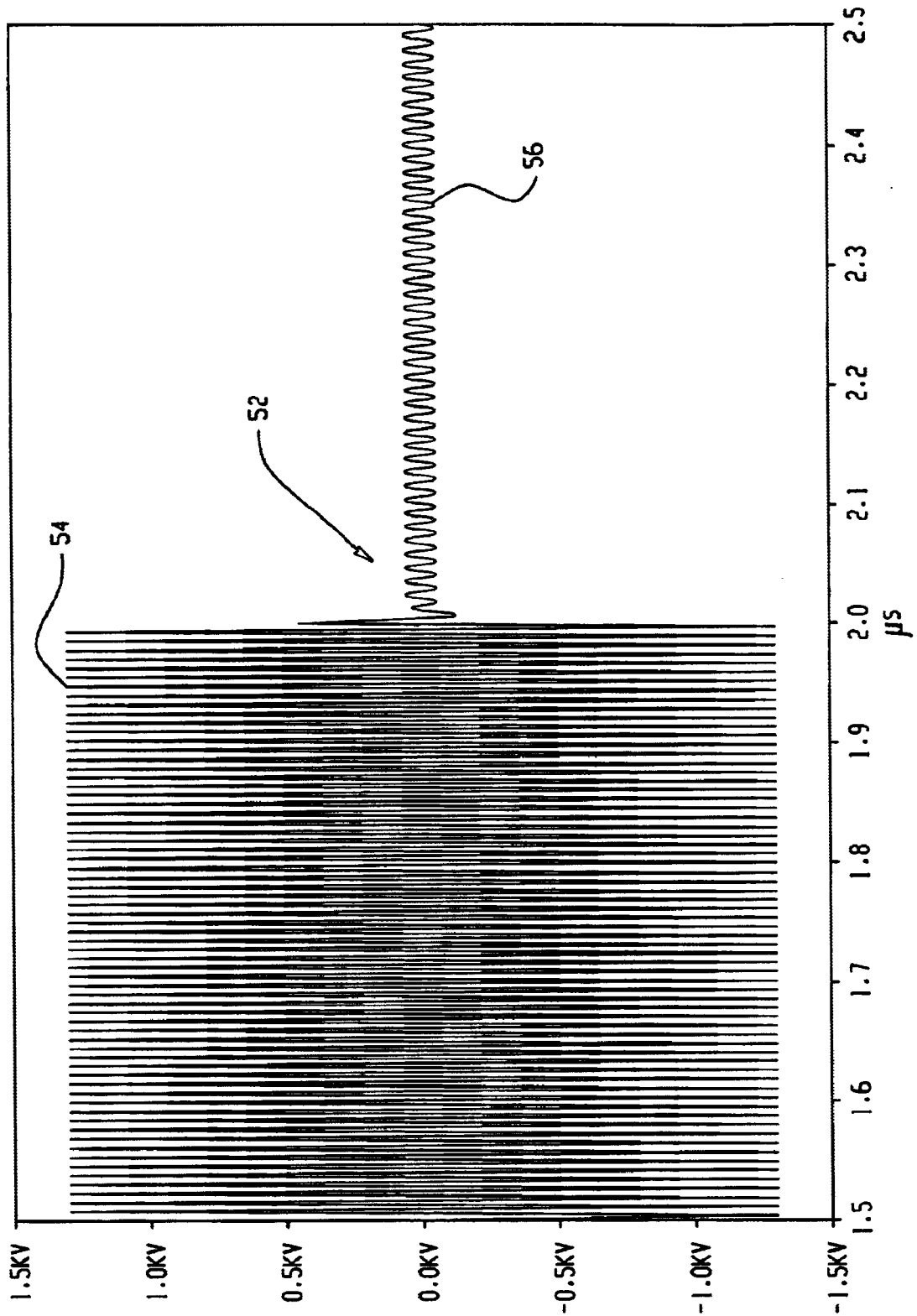
FIG. 2 is a time-voltage graph showing start-up and steady-state voltages.

During lamp ignition, and with reference to FIG. 2, the ballast circuit boosts the voltage across the lamp 52 to a temporary ignition voltage 54. With a lamp having a steady state resistance of 400 Ω, the ballast achieves 1.2 kV with a battery voltage of 5.5 volts. This ensures sufficient voltage as the battery discharges. From the time the lamp is switched on (0 s) to lamp ignition at about 2 ms, the starting voltage of 1.2 kV is applied. After the lamp ignites, the voltage settles to a steady state voltage 56 between 40 and 60 volts, with 50 volts being preferred. The steady state voltage 56 is maintained while the lamp is in normal operation.

Figure 3:
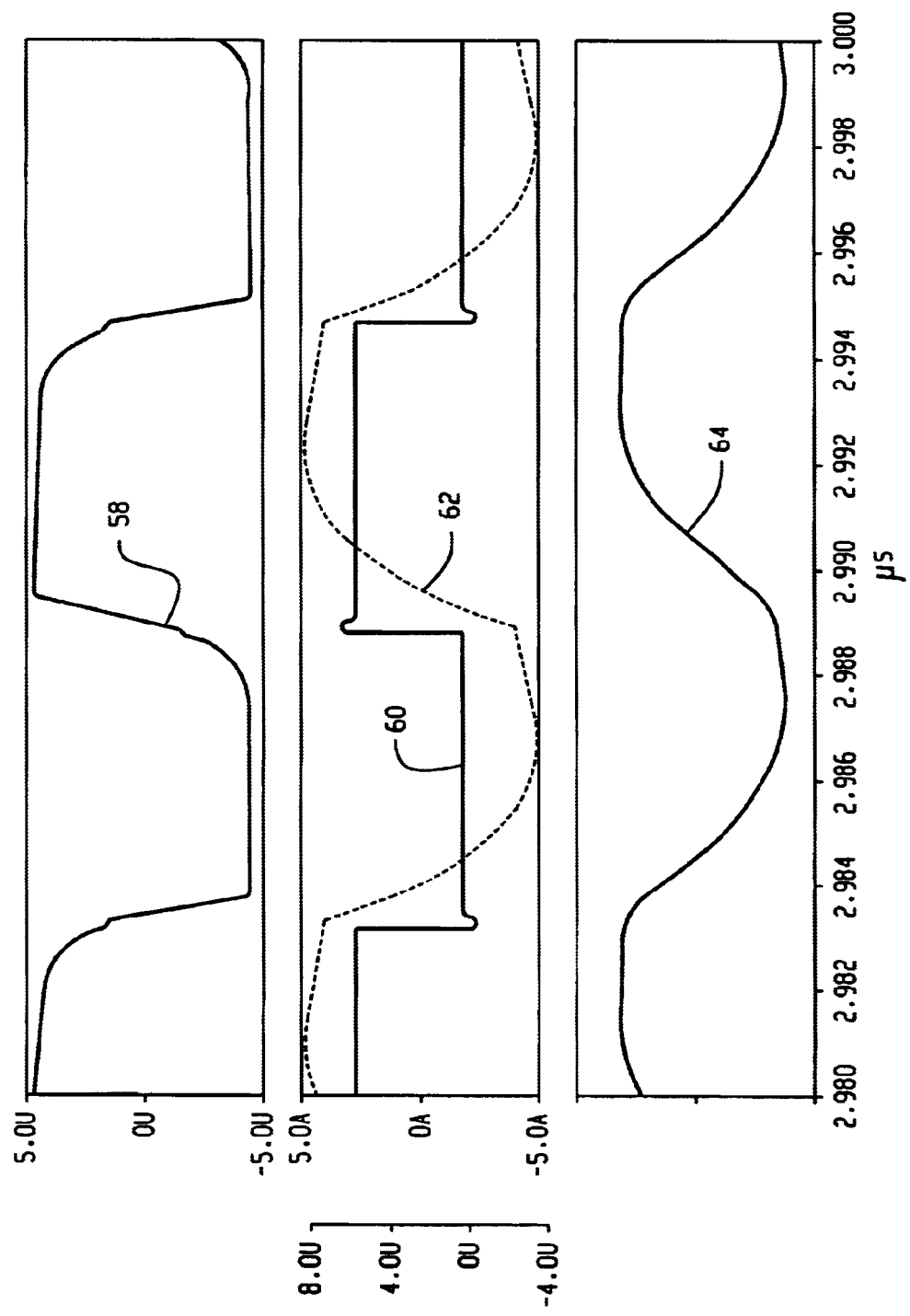
FIG. 3 is a graph showing circuit activity in select components in time.

With reference to FIG. 3, waveforms across select circuit components are provided over a period of 20 μs. The curve 58 depicts a gate-source voltage of the first and second transistors 20, 22. Only one is shown, but the other transistor has a gate-source voltage preferably identical, but 180° out of phase. As is shown, the gate source voltage resembles a square wave, having transition periods of less than 2 μs, ranging from approximately 5V to −5V. The source drain voltage of the second transistor 60 is provided. This square wave function ranges from about 5.5 to 6 V (bus voltage) down to zero volts. The current across the phase inductor 62 is provided for comparison. The current 62 preferably alternates between approximately 5 A and −5 A. The curve 64 is the resultant voltage across the lamp 10, which is an AC signal.

Exemplary component values for the circuit of FIG. 1 are as follows:

| Part Description | Part Number | Nominal Value |
| --- | --- | --- |
| Lamp | 10 | 23 watts |
| DC Bus Voltage | 16 | 6 Volts |
| Circuit Reference | 18 | 0 Volts |
| Serial Capacitor | 27 | 47 nanofarads |
| First Transistor | 20 | IRLML2502 |
| Second Transistor | 22 | IRLML6401 |
| Drive Inductor | 28 | 5.6 microhenries |
| Resonant Inductor | 30 | 560 microhenries |
| Phase Inductor | 32 | 220 microhenries |
| Resonant Capacitor | 33 | 2.2 nanofarads |
| Primary Winding | 36 | 13.9 microhenries |
| Secondary Winding | 38 | 8 millihenries |
| Smoothing Capacitor | 40 | 10 microfarads |
| Smoothing Capacitor | 42 | 10 microfarads |
| Starting Resistor | 44 | 100 k Ohms |
| Starting Resistor | 46 | 3 k Ohms |
| Zener Diode | 48 | 1N5227 |
| Zener Diode | 50 | 1N5227 |

The invention has been described with reference to the preferred embodiment. Modifications and alterations will occur to others upon a reading and understanding of the preceding detailed description. It is intended that the invention be construed as including all such modifications and alterations insofar as they come within the scope of the appended claims or the equivalents thereof.

What is claimed is:

1. A lighting ballast comprising:

a voltage source;

a switching portion including first and second complementary transistors for converting a direct current signal into an alternating current signal;

a drive portion;

a resonant load portion for receiving a lamp; and, a transformer for boosting voltage from the voltage source to the resonant load portion.

2. The lighting ballast as set forth in claim 1, wherein the resonant load portion requires a starting voltage of up to 600 V or more to ignite the lamp.

3. The lighting ballast as set forth in claim 1, wherein the voltage source supplies between 5 and 7 volts to the ballast.

4. The lighting ballast as set forth in claim 1, wherein the transformer boosts the voltage from the voltage source to over 1000 V across the resonant load portion during a lamp ignition period.

5. The lighting ballast as set forth in claim 1, wherein a potential across the resonant load portion is approximately 50 V during a steady-state operation period.

6. The lighting ballast as set forth in claim 1, wherein the transformer includes a primary coil and a secondary coil, the secondary coil being in operative connection with the resonant load portion.

7. The lighting ballast as set forth in claim 6, wherein current is induced in the secondary coil by current passing through the primary coil, the induced current being controllable by varying a coil turns ratio of the secondary coil to the primary coil.

8. The lighting ballast as set forth in claim 1, wherein the transformer is an auto transformer.

9. A method of igniting a lamp comprising:

supplying a threshold voltage across a resonant load portion of a lighting ballast, the threshold voltage being significantly higher than a voltage from the voltage source, the voltage from the voltage source being boosted by a transformer; and, converting direct current from the voltage source into alternating current by passing the current from the voltage source through a switching portion, the switching portion including a first transistor and a second transistor.

10. The method as set forth in claim 9, wherein the threshold voltage is between 500 and 700 volts, and the voltage source is between 5 and 7 volts.

11. The method as set forth in claim 9, wherein the transformer boosts the voltage more in an ignition phase of the ballast than in a steady state operation phase of the ballast.

12. The method as set forth in claim 9, further including:

controlling a variable tap on a secondary winding of the transformer, the variable tap being used to vary a turns ratio of the secondary winding to a primary winding of the transformer.

13. The method as set forth in claim 12, wherein the variable tap on the secondary winding is used to control an intensity of the light source during steady-state operation of the light source.

14. A portable lighting ballast comprising:

a direct current battery;

a compact fluorescent lamp that requires an alternating signal of at least 600 volts to ignite;

a complementary pair of MOSFETs that turn a direct current signal from the battery into an alternating current signal;

a resonant inductor winding;

a drive inductor winding that taps power from the resonant inductor winding;

a transformer for boosting voltage to the lamp, the transformer including:

a primary winding that develops a voltage when subjected to current;

a secondary winding that boosts the voltage across the primary winding, providing a forcing function that is amplified by a turns ratio of the primary and secondary windings.

15. The portable lighting ballast as set forth in claim 14, wherein the battery is one of a 6 volt cell, and multiple cells that equal 6 volts when connected in series.

16. The portable lighting ballast as set forth in claim 14, wherein the transformer boosts the voltage across the primary winding to approximately 1200 volts.

17. The portable lighting ballast as set forth in claim 14, wherein the turns ratio is adjustable in steady-state operation to vary an intensity of the lamp.

* * * * *